US008116273B2

(12) United States Patent
Cho et al.

(10) Patent No.: US 8,116,273 B2
(45) Date of Patent: Feb. 14, 2012

(54) APPARATUS AND METHOD FOR SUPPORTING HYBRID AUTOMATIC REPEAT REQUEST IN A BROADBAND WIRELESS COMMUNICATION SYSTEM

(75) Inventors: Jae-Hee Cho, Seoul (KR); Si-Hyun Park, Hwaseong-si (KR); Soon-Young Yoon, Seoul (KR); Yong-Seok Kim, Hwaseong-si (KR); Chung-Ryul Chang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 159 days.

(21) Appl. No.: 12/383,651

(22) Filed: Mar. 26, 2009

(65) Prior Publication Data
US 2009/0245096 A1 Oct. 1, 2009

(30) Foreign Application Priority Data

Mar. 26, 2008 (KR) ........................ 10-2008-0027781

(51) Int. Cl.
*H04W 4/00* (2009.01)
(52) U.S. Cl. ........ 370/329; 370/341; 370/431; 370/436; 370/437; 370/443; 375/260; 375/267; 375/299; 455/450; 455/451; 455/452.2
(58) Field of Classification Search .................. 370/208, 370/216, 295, 329, 248, 341, 344, 468, 437, 370/443, 394, 230.1, 231, 235, 236; 714/48, 714/52, 748; 455/450, 451, 452.2, 153; 375/260, 375/267, 299
See application file for complete search history.

(56) References Cited

U.S. PATENT DOCUMENTS

| 7,028,230 | B2 * | 4/2006 | Manninen et al. | 714/702 |
|---|---|---|---|---|
| 7,317,680 | B2 * | 1/2008 | Ma et al. | 370/203 |
| 7,486,735 | B2 * | 2/2009 | Dubuc et al. | 375/260 |
| 7,715,311 | B2 * | 5/2010 | Herrmann | 370/227 |
| 7,778,151 | B2 * | 8/2010 | Bertrand et al. | 370/208 |
| 7,782,900 | B2 * | 8/2010 | Bachl et al. | 370/468 |
| 2003/0110435 | A1 * | 6/2003 | Wu et al. | 714/748 |
| 2005/0152299 | A1 * | 7/2005 | Stephens | 370/315 |
| 2005/0201325 | A1 * | 9/2005 | Kang et al. | 370/328 |
| 2006/0133522 | A1 * | 6/2006 | Sutivong et al. | 375/260 |
| 2007/0043982 | A1 * | 2/2007 | Arivoli et al. | 714/701 |
| 2007/0081484 | A1 * | 4/2007 | Wang | 370/315 |
| 2007/0153735 | A1 * | 7/2007 | Frederiksen et al. | 370/329 |
| 2007/0168827 | A1 * | 7/2007 | Lohr et al. | 714/749 |
| 2007/0183451 | A1 * | 8/2007 | Lohr et al. | 370/473 |

(Continued)

FOREIGN PATENT DOCUMENTS
EP 1819079 A1 * 8/2007

*Primary Examiner* — Aung S Moe
*Assistant Examiner* — Benjamin H Elliott, IV

(57) ABSTRACT

A broadband wireless communication system using a plurality of Frequency Allocations (FAs) is provided. A method for packet transmission of a packet of a transmitting end includes dividing one encoded packet into a plurality of parts, mapping a plurality the plurality of parts of the packet to the FAs through the plurality of different FAs transmission, when a re-transmission request is received, re-mapping the plurality of parts of the packet to the FAs such that at least one of the at least one of the plurality of parts is re-mapped to an FA that is different than an FA previously mapped thereto. Retransmitting the encoded packet by at least one of a number of sub-units.

10 Claims, 8 Drawing Sheets

U.S. PATENT DOCUMENTS

| | | | |
|---|---|---|---|
| 2007/0300120 A1* | 12/2007 | Kim et al. | 714/749 |
| 2008/0144572 A1* | 6/2008 | Makhijani | 370/330 |
| 2008/0165743 A1* | 7/2008 | Palanki et al. | 370/335 |
| 2008/0317142 A1* | 12/2008 | Wang et al. | 375/260 |
| 2009/0022098 A1* | 1/2009 | Novak et al. | 370/329 |
| 2009/0059857 A1* | 3/2009 | Kim et al. | 370/329 |
| 2009/0092118 A1* | 4/2009 | Naka et al. | 370/343 |
| 2009/0168662 A1* | 7/2009 | Tsuboi et al. | 370/252 |
| 2009/0175243 A1* | 7/2009 | Han et al. | 370/335 |
| 2009/0245096 A1* | 10/2009 | Cho et al. | 370/216 |

* cited by examiner

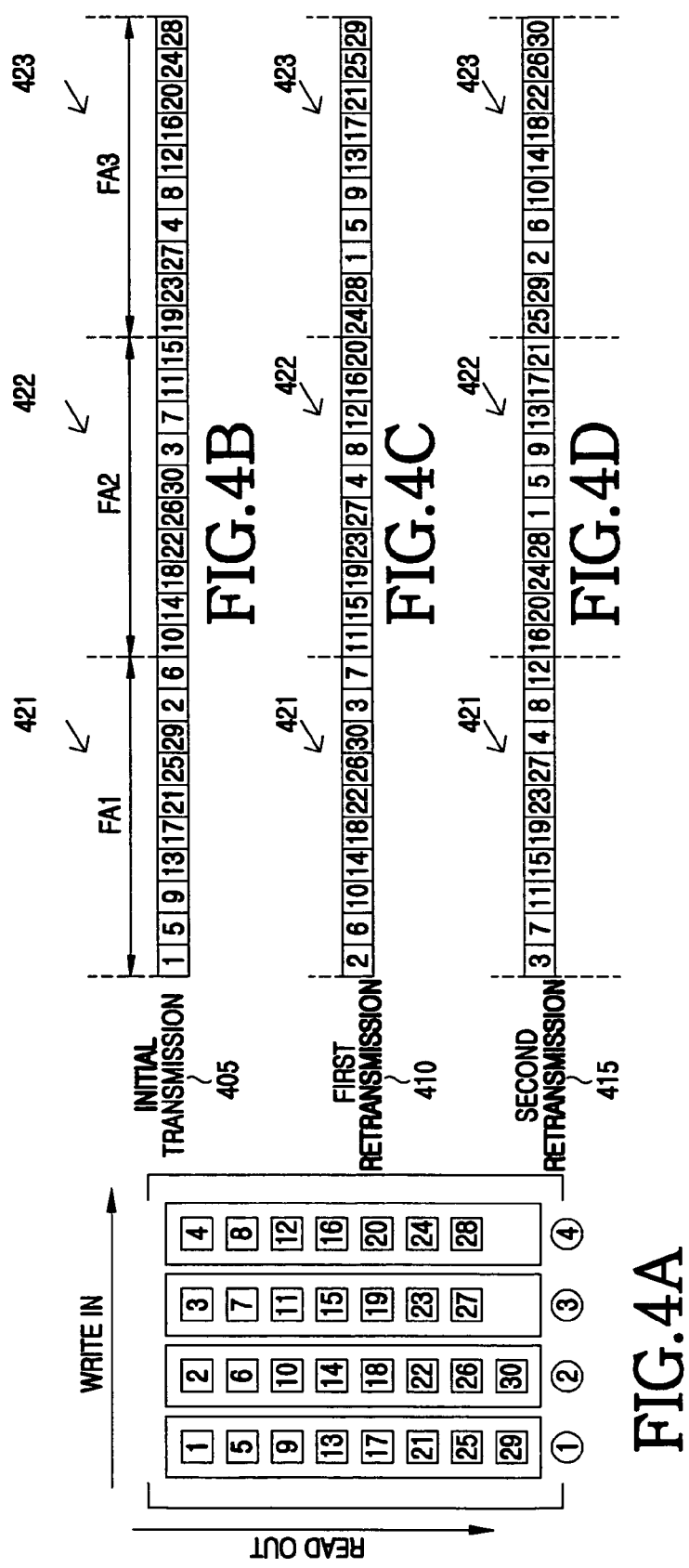

APPARATUS AND METHOD FOR SUPPORTING HYBRID AUTOMATIC REPEAT REQUEST IN A BROADBAND WIRELESS COMMUNICATION SYSTEM

PRIORITY

The present application claims the benefit under 35 U.S.C. §119(a) of a Korean patent application filed in the Korean Intellectual Property Office on Mar. 26, 2008 and assigned Serial No. 10-2008-0027781, the entire disclosure of which is hereby incorporated by reference.

TECHNICAL FIELD OF THE INVENTION

The present invention relates to a broadband wireless communication system and, more particularly, to an apparatus and method for supporting hybrid automatic repeat request in a broadband wireless communication system.

BACKGROUND OF THE INVENTION

Today, many wireless communication techniques are being proposed to achieve a high-speed mobile communication. Among them, an Orthogonal Frequency Division Multiplexing (OFDM) scheme is accepted as one of the most promising techniques for a next generation wireless communication. The OFDM scheme is expected to be widely used in the future wireless communication techniques, and currently is used as a standard in the Institute of Electrical and Electronics Engineers (IEEE) 802.16-based Wireless Metropolitan Area Network (WMAN) referred to as the 3.5 generation technology.

Meanwhile, the wireless communication systems are evolving to provide a high-speed data service in comparison with a legacy system or to address an implementation issue. In such a system evolution process, various systems may coexist in the same area according to a degree of compatibility with the legacy system. For example, a new system may be installed in an area where an IEEE 802.16e system exists. In this case, the new system has to be able to provide services not only to a legacy Mobile Station (MS) but also to a new MS.

A currently used OFDM-based broadband wireless communication system has a structure wherein only an MS using a single bandwidth can be supported using one Frequency Allocation (FA). Therefore, to support a new MS, using a wider bandwidth to be developed in the future, an FA of the system has to be changed to a new FA having a bandwidth corresponding to the wider bandwidth used by the new MS. However, due to the change of the FA, the system cannot provide a service to a legacy MS using a narrow bandwidth. That is, there is a problem in that all legacy MSs have to be changed while changing the FA of the system. Accordingly, there is a need for a method of supporting both a legacy MS, using a narrow bandwidth, and a new MS, using a wide bandwidth, in an evolution process of a broadband wireless communication system.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and method for supporting both a mobile station using a narrow bandwidth and a mobile station using a wide bandwidth in a broadband wireless communication system.

Another aspect of the present invention is to provide an apparatus and method for using a plurality of frequency allocations according to a frequency overlay scheme in a broadband wireless communication system.

Another aspect of the present invention is to provide an apparatus and method for increasing a retransmission gain by using hybrid automatic repeat request when a plurality of frequency allocations are used according to a frequency overlay scheme in a broadband wireless communication system.

Another aspect of the present invention is to provide an apparatus and method for determining frequency allocations to be used for packet retransmission when a plurality of frequency allocations are used according to a frequency overlay scheme in a broadband wireless communication system.

In accordance with an aspect of the present invention, a method for packet transmission of a packet of a transmitting end using a plurality of Frequency Allocations (FAs) in a wireless communication system is provided. The method includes dividing one encoded packet into a plurality of parts, mapping the plurality of parts of the packet to the FAs through the plurality of different FAs transmission, and when a retransmission request is received, re-mapping the plurality of parts of the packet to the FAs such that at least one of the plurality of parts is re-mapped to an FA that is different than an FA previously mapped thereto. Retransmitting the encoded packet by at least one of a number of sub-units.

In accordance with another aspect of the present invention, an apparatus for transmitting a packet using a plurality of Frequency Allocations (FAs) in a wireless communication system is provided. The apparatus includes a plurality of transmitters for transmitting the plurality of parts through the FAs, at least one mapper for mapping the parts of the packet to the FAs, a controller for changing a mapping relation between a plurality of parts of the packet and the FAs such that at least one of the plurality of parts is re-mapped to an FA that is different than an FA previously mapped thereto.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts

FIGS. 4A to 4D illustrate an example of FA change by using an interleaving column switching scheme in a broadband wireless communication system according to an exemplary embodiment of the present invention;

DETAILED DESCRIPTION OF THE INVENTION

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention to be described below relates to a technique for simultaneously supporting Mobile Stations (MSs) using different-sized bandwidths. In particular, the present invention relates to a technique for applying Hybrid Automatic Repeat Request (HARQ) when multi-Frequency Allocation (FA) access is achieved according to a frequency overlay scheme. Although an Orthogonal Frequency Division Multiplexing (OFDM)/Orthogonal Frequency Division Multiple Access (OFDMA)-based wireless communication system will be described as an example hereinafter, the present invention may also apply to other types of wireless communication systems.

First, a wireless communication system considered in the present invention will be described in brief.

Figure 1A:
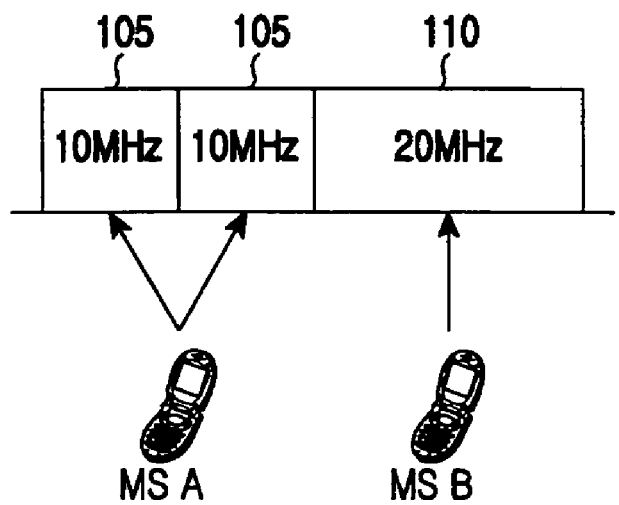
FIGS. 1A and 1B illustrate examples of frequency band use for supporting all Mobile Stations (MSs) using different bandwidths in a broadband wireless communication system.
Figure 1B:
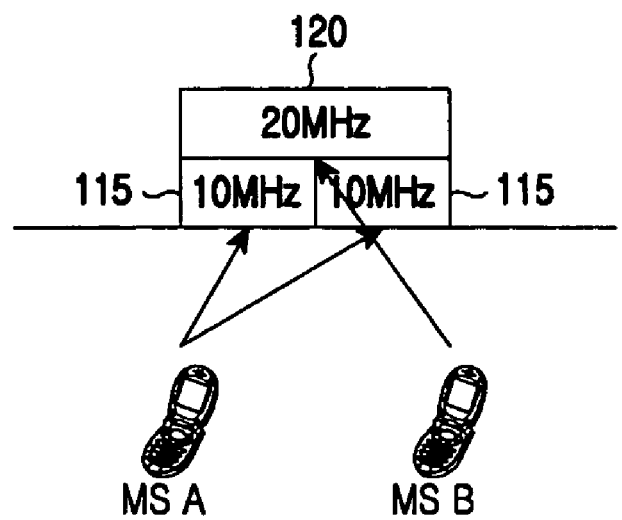

FIGS. 1A and 1B illustrate examples of a bandwidth switching process in a broadband wireless communication system. If a system operating an FA having a bandwidth of 10 Mega Hertz (MHz) intends to operate an FA having a bandwidth of 20 MHz, the following switching schemes are expected to be used.

In a first scheme, as shown in FIG. 1A, while operating an FA having a bandwidth of 10 MHz 105, an FA having a bandwidth of 20 MHz 110 is also operated simultaneously at a separate frequency band. In a second scheme (i.e., a frequency overlay scheme), as shown in FIG. 1B, while operating an FA having a bandwidth of 10 MHz 115, an FA having a bandwidth of 20 MHz 120 is also operated simultaneously by combining two FAs each having a bandwidth of 10 MHz 115 at the same frequency band. A wide bandwidth is required when operating a separate FA, as shown in FIG. 1A. Therefore, in terms of spectral efficiency, it is preferable to use the frequency overlay scheme of FIG. 1B. Therefore, a broadband wireless communication system conforming to the frequency overlay scheme of FIG. 1B is taken into account in the present invention.

Figure 2A:
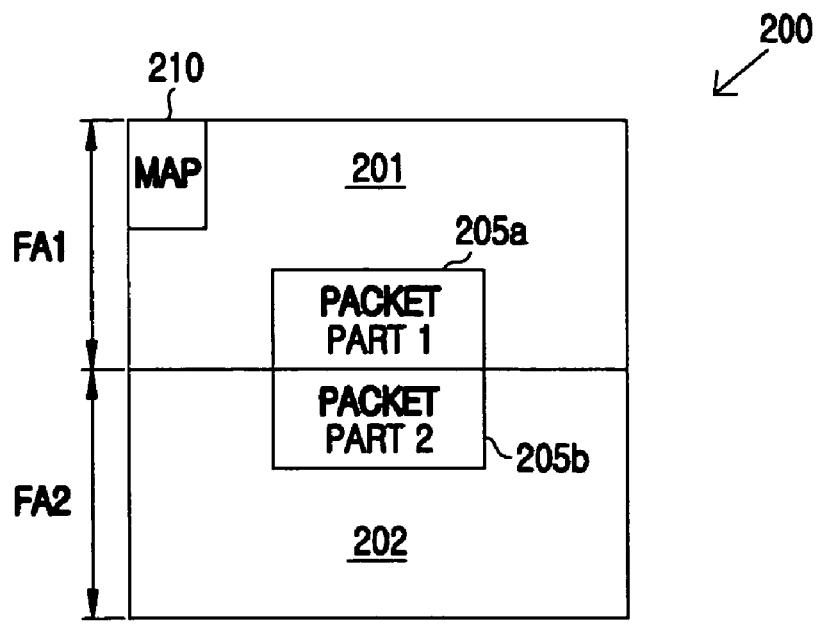
FIGS. 2A and 2B illustrate examples of encoded packet mapping in a broadband wireless communication system according to an exemplary embodiment of the present invention.

In a broadband wireless communication system of the present invention, a resource allocated to an MS having multi-FA access capability has a format 200 of FIG. 2A. As shown in FIG. 2A, a resource for transmitting an encoded packet 205 is allocated throughout two FAs (i.e., FA1 201 and FA2 202). A MAP message 205 for reporting information regarding an address of the allocated resource, the number of slots in each FA, and the like, is located in any one of the FAs. For example, when k slots are allocated to the encoded packet 205, the allocated slots are n slots included in the FA1 201 and (k−n) slots included in the FA2 202.

Figure 2B:
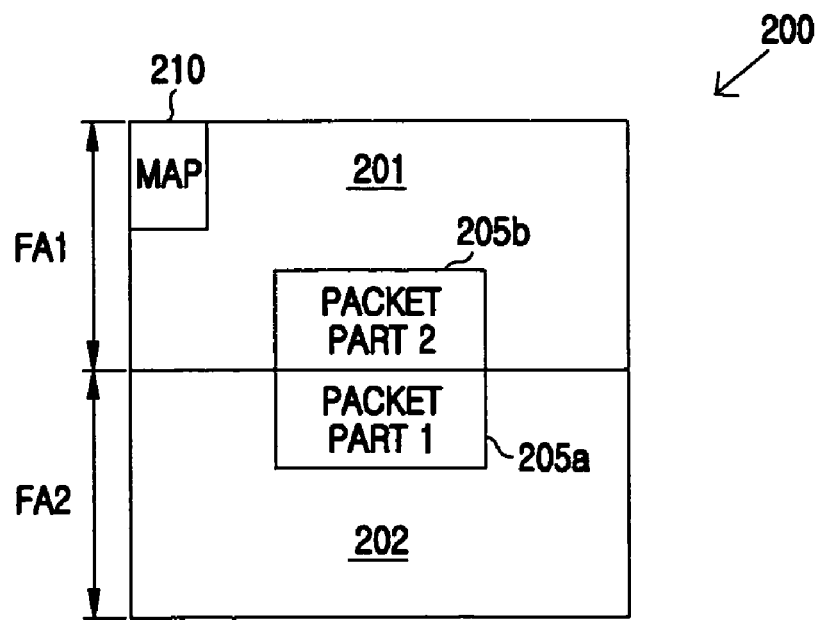

If the encoded packet 205 needs to be retransmitted due to unsuccessful transmission of the packet, as shown in FIG. 2B, a part of the encoded packet 205a transmitted using the FA1 201 is retransmitted using the FA2 202, and a part of the encoded packet 205b transmitted using the FA2 202 is retransmitted using the FA1 201. That is, an FA used at initial transmission differs from that used at retransmission. As a result, an additional frequency gain is produced.

As a specific example of changing an FA used at retransmission as described above, the present invention proposes an address mapping scheme and an interleaving column switching scheme.

First, the address mapping scheme will be described. In a wireless communication system of the present invention, to transmit an encoded packet 300 using an allocated resource, a transmitting end divides the encoded packet into a plurality of slot-sized parts, and maps the respective parts to actual physical slots. When the encoded packet is retransmitted, according to a predetermined rule, the transmitting end recalculates positions of the physical slots to be mapped with the respective parts. In this case, the rule is defined such that parts mapped to a $k^{th}$ FA at $n^{th}$ transmission are mapped to $(k+1)^{th}$ FA at $(n+1)^{th}$ transmission. The slot can be expressed in a Resource Unit (RU) or a subchannel.

Figure 3A:
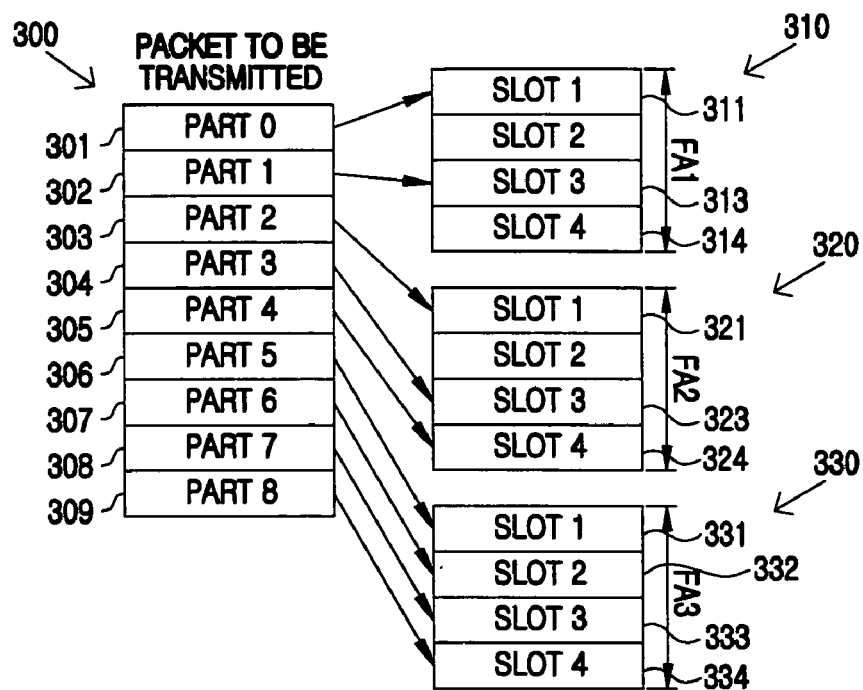
FIGS. 3A and 3B illustrate examples of Frequency Allocation (FA) change by using an address mapping scheme in a broadband wireless communication system according to an exemplary embodiment of the present invention.
Figure 3B:
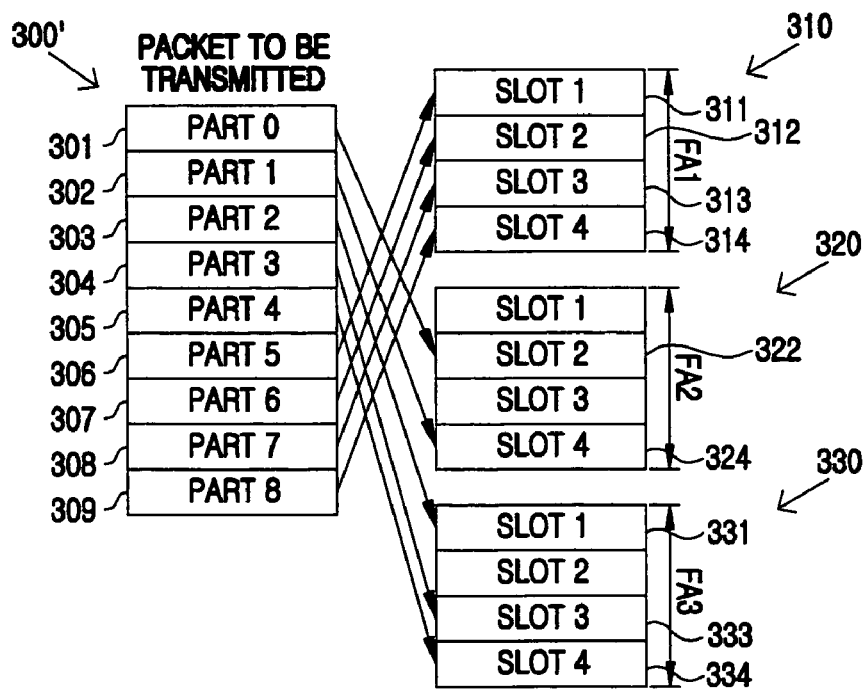

For example, when the encoded packet is transmitted using three (3) FAs, address mapping is changed by retransmission as shown in FIGS. 3A and 3B. FIGS. 3A and 3B illustrate an example of FA mapping at initial transmission and retransmission when an encoded packet 300 occupying nine (9) slots is transmitted. Referring to FIG. 3A, the encoded packet 300 is divided in a slot unit, and among the divided parts 301 to 309, a part 0 301 and a part 1 302 are mapped to slots 311, 313, within a FA1 310, a part 2 3023 to a part 4 305 are mapped to slots 321, 323, 324 within an FA2 320, and a part 5 306 to a part 8 309 are mapped to slots 331-334 within an FA3 330. Further, when the encoded packet 300, mapped as shown in FIG. 3A, is retransmitted, the retransmitted encoded packet 300' is mapped as shown in FIG. 3B. Referring to FIG. 3B, a part 0 301 and a part 1 302 are mapped to slots 322, 324 within an FA2 320, a part 2 303 to a part 4 305 are mapped to slots 331, 333, 334 within an FA3 330, and a part 5 306 to a part 8 309 are mapped to slots 311-314 within an FA1 310. For this, according to a predetermined rule, the transmitting end calculates an FA to be mapped with each part of the retransmitted packet 300'. In FIGS. 3A and 3B, an identical number of slots are allocated to each FA, and thus all parts are retransmitted using an FA different from that used at initial transmission.

However, unlike FIGS. 3A and 3B, if a different number of slots are allocated to each FA, only some of the parts can be transmitted using an FA different from that used at initial transmission.

Next, the interleaving column switching scheme will be described. In a broadband wireless communication system of the present invention, a transmitting end performs block interleaving on an encoded packet in a symbol unit, and thereafter, transmits the resultant packet. For example, when the encoded packet consists of thirty (30) symbols, interleaving is performed as shown in FIG. 4A. That is, the transmitting end performs interleaving by writing the thirty (30) symbols in a horizontal-axis direction in an interleaving buffer configured with an 8×4 matrix form, and by reading out the thirty (30) symbols in a vertical-axis direction from the interleaving buffer. Upon reading out the thirty (30) symbols arranged in a matrix form, the transmitting end changes an FA used at retransmission by changing an order of reading out the symbols along the columns.

For example, when the encoded packet consisting of the thirty (30) symbols are transmitted using three (3) FAs, distribution of the symbols at initial transmission and retransmission is as shown in FIG. 4B through FIG. 4D. If the symbols are read out in an order of a $1^{st}$ column, a $2^{nd}$ column, a $3^{rd}$ column, and a $4^{th}$ column at initial transmission 405, distribution of the symbols transmitted using each FA is as shown in FIG. 4B. Referring to FIG. 4B, symbols 1, 5, 9, 13, 17, 21, 25, 29, 2, and 6 are transmitted using an FA1 421, symbols 10, 14, 18, 22, 26, 30, 3, 7, 11, and 15 are transmitted using an FA2 422, symbols 19, 23, 27, 4, 8, 12, 16, 20, 24, and 28 are transmitted using an FA3 423.

If the symbols are read out in an order of the $2^{nd}$ column, the $3^{rd}$ column, the $4^{th}$ column, and the $1^{st}$ column at first retransmission 410, distribution of the symbols transmitted using each FA is as shown in FIG. 4C. Referring to FIG. 4C, symbols 2, 6, 10, 14, 18, 22, 26, 30, 3, and 7 are transmitted using the FA1 421, symbols 11, 15, 19, 23, 27, 4, 8, 12, 16, and 20 are transmitted using the FA2 422, and symbols 24, 28, 1, 5, 9, 13, 17, 21, 25, and 29 are transmitted using the FA3 423.

In addition, if the symbols are read out in an order of the $3^{rd}$ column, the $4^{th}$ column, the $1^{st}$ column, and the $2^{nd}$ column at second retransmission 415, distribution of the symbols transmitted using each FA is as shown in FIG. 4D. Referring to FIG. 4D, symbols 3, 7, 11, 15, 19, 23, 27, 4, 8, and 12 are transmitted using the FA1 421, symbols 16, 20, 24, 28, 1, 5, 9, 13, 17, and 21 are transmitted using the FA2 422, and symbols 25, 29, 2, 6, 10, 14, 18, 22, 26, and 30 are transmitted using the FA3 423.

That is, as shown in FIG. 4B to FIG. 4D, most symbols constituting the encoded packet are transmitted using different FAs at each retransmission by using the interleaving column switching scheme.

Hereinafter, an operation and structure of a transmitting end for retransmitting packets according to the aforementioned schemes will be described in greater detail.

Figure 5:
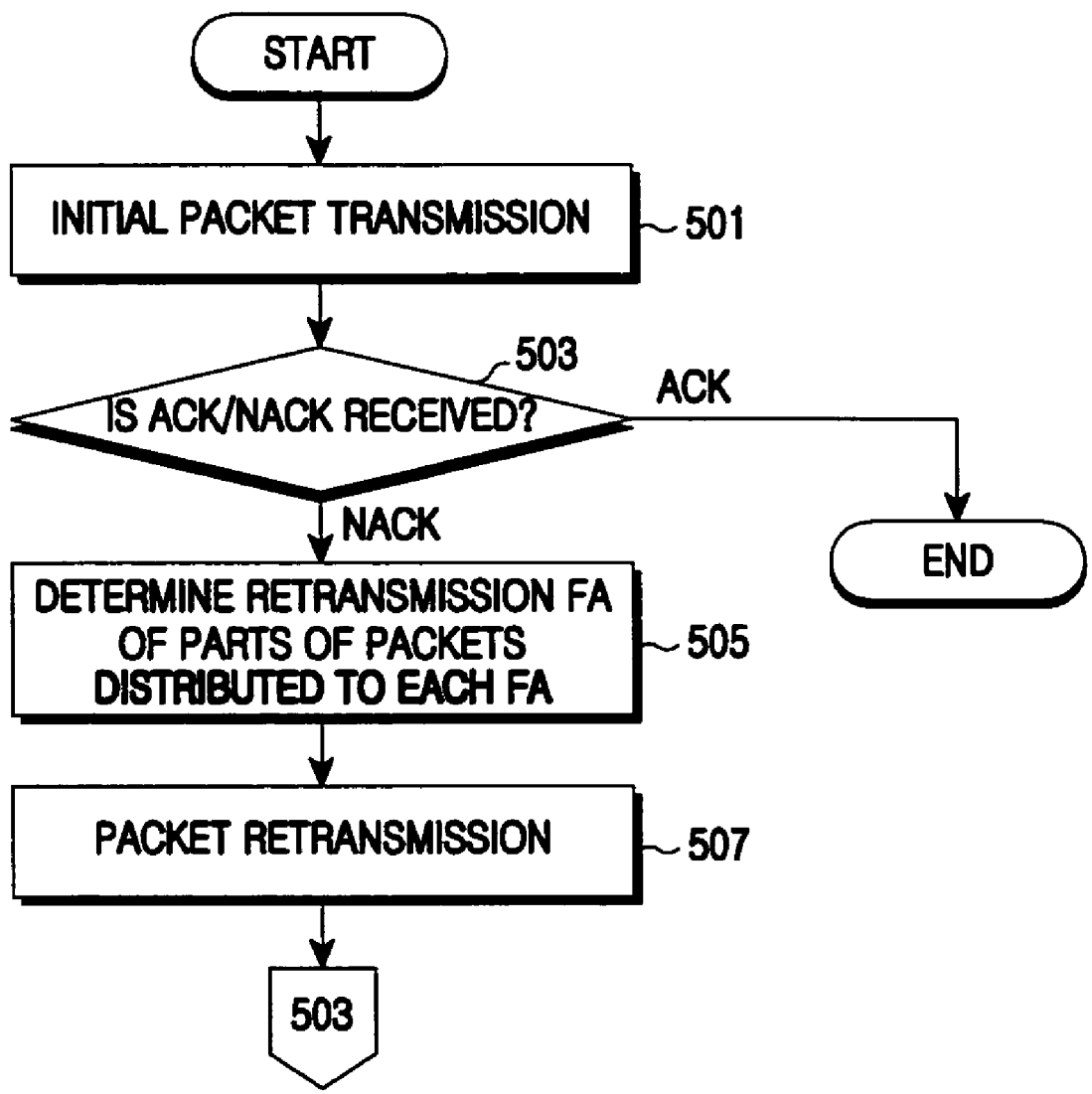
FIG. 5 illustrates a flowchart for a packet transmission process of a transmitting end in a broadband wireless communication system according to an exemplary embodiment of the present invention.

FIG. 5 illustrates a flowchart for a packet transmission process of a transmitting end in a broadband wireless communication system according to an exemplary embodiment of the present invention.

Referring to FIG. 5, the transmitting end initially transmits an encoded packet in step 501. In this step, the transmitting end distributively maps the encoded packet to a plurality of FAs. In other words, the transmitting end transmits the encoded packet through a plurality of FAs.

After initially transmitting the encoded packet, proceeding to step 503, the transmitting end determines whether acknowledge (ACK) or Non-ACK (NACK) on the encoded packet is transmitted from a receiving end. That is, the transmitting end determines whether the encoded packet needs to be retransmitted. The procedure of FIG. 5 ends when the ACK is received.

Upon receiving the NACK, proceeding to step 505, the transmitting end determines an FA to be used at retransmission with respect to each part of the encoded packet distributively mapped to each FA at initially transmission. In this step, the transmitting end determines FAs to be used at retransmission so that different FAs are mapped at initial transmission and retransmission to at least one of the subunit entities constituting the parts of the encoded packet. In other words, the transmitting end determines FAs to be used at retransmission so that each subunit entity is transmitted using one of the at least one FA excluding the FA used at a previous transmission. The subunit entity is a part or a symbol. The determination of the FAs for retransmission may be performed using various schemes. For example, the address mapping scheme of FIG. 3 or the interleaving column switching scheme of FIG. 4 can be used. When the address mapping scheme is used, the transmitting end recalculates FAs to be mapped with slot-sized parts included in each part. When the interleaving column switching scheme is used, the transmitting end reads out symbols from a block interleaving buffer in an order different from that used at previous transmission, and determines FAs to be mapped with the symbols in an order of reading out the symbols.

After determining the FA to be used at retransmission with respect to each part of the encoded packet, proceeding to step 507, the transmitting end retransmits the encoded packet through the determined FA. That is, the transmitting end maps each subunit entity constituting the parts of the encoded packet to its corresponding FA, and thereafter, retransmits the resultant packet to the receiving end.

Figure 6:
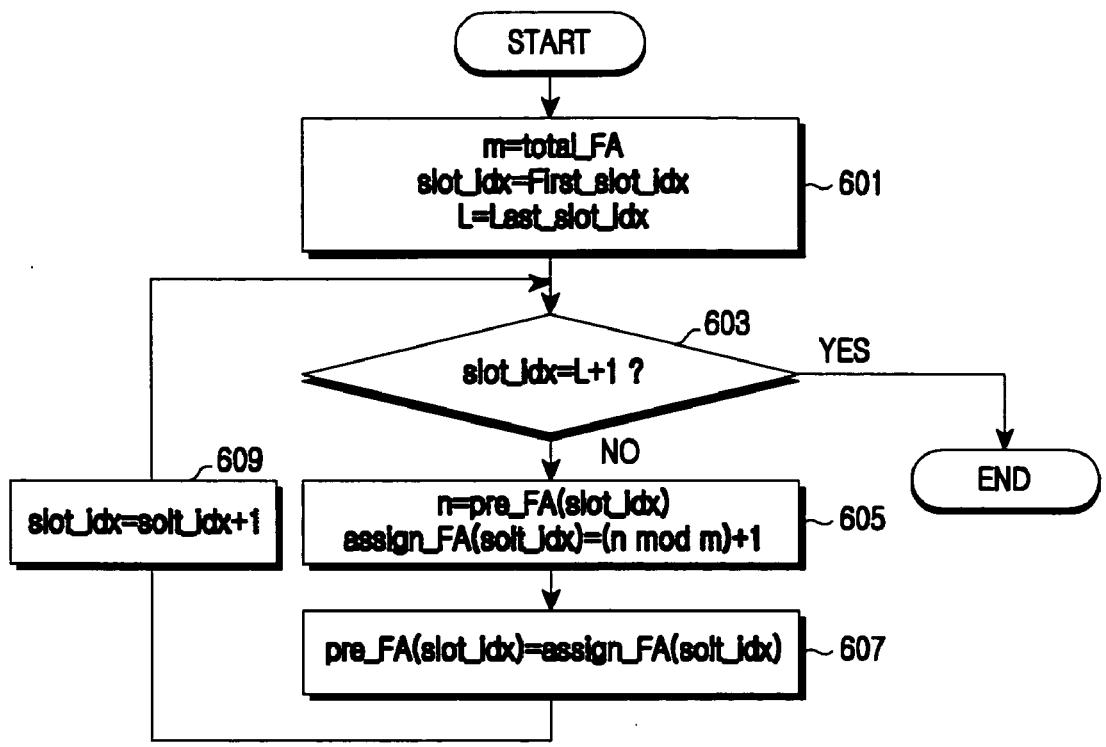
FIG. 6 illustrates a flowchart for an FA change process using an address mapping scheme of a transmitting end in a broadband wireless communication system according to an exemplary embodiment of the present invention.

FIG. 6 illustrates a flowchart for an FA change process using an address mapping scheme of a transmitting end in a broadband wireless communication system according to an exemplary embodiment of the present invention. The process of FIG. 6 is an exemplary operation of step 505 of FIG. 5 when the address mapping scheme is used.

Referring to FIG. 6, in step 601, the transmitting end initializes m to total_FA, which indicates a total number of FAs used to transmit an encoded packet, initializes slot_idx to First_slot_idx, which indicates an index of a first slot of the encoded packet, and initializes L to Last_slot_idx, which indicates an index of a last slot of the encoded packet.

After initializing these variables (i.e., m, slot_idx, and L), proceeding to step 603, the transmitting end determines whether the slot_idx is equal to L+1. If the slot_idx is equal to L+1, the procedure of FIG. 6 ends.

Otherwise, if the slot_idx is not equal to L+1, proceeding to step 605, the transmitting end sets n to pre_FA(slot_idx), i.e., an index of an FA mapped with a (slot_idx)$^{th}$ slot of the encoded packet at previous transmission. Further, the transmitting end sets assign_FA(slot_idx), i.e., a retransmission FA of the (slot_idx)$^{th}$ slot of the encoded packet, to a sum of '1' and a value obtained as a result of performing a modulo operation on the n and the m.

In step 607, the transmitting end sets the pre_FA(slot_idx) to assign_FA(slot_idx) set in step 605. That is, to calculate an FA to be retransmitted at next retransmission, the transmitting end updates the pre_FA(slot_idx).

In step 609, the transmitting end increments the slot_idx by '1', and the procedure returns to step 603.

By performing the procedure of FIG. 6, a retransmission FA of each part of the encoded packet is determined as a next FA of the FA used at previous transmission. That is, a mapping relation between the parts and the FAs is cyclic shifted.

Figure 7:
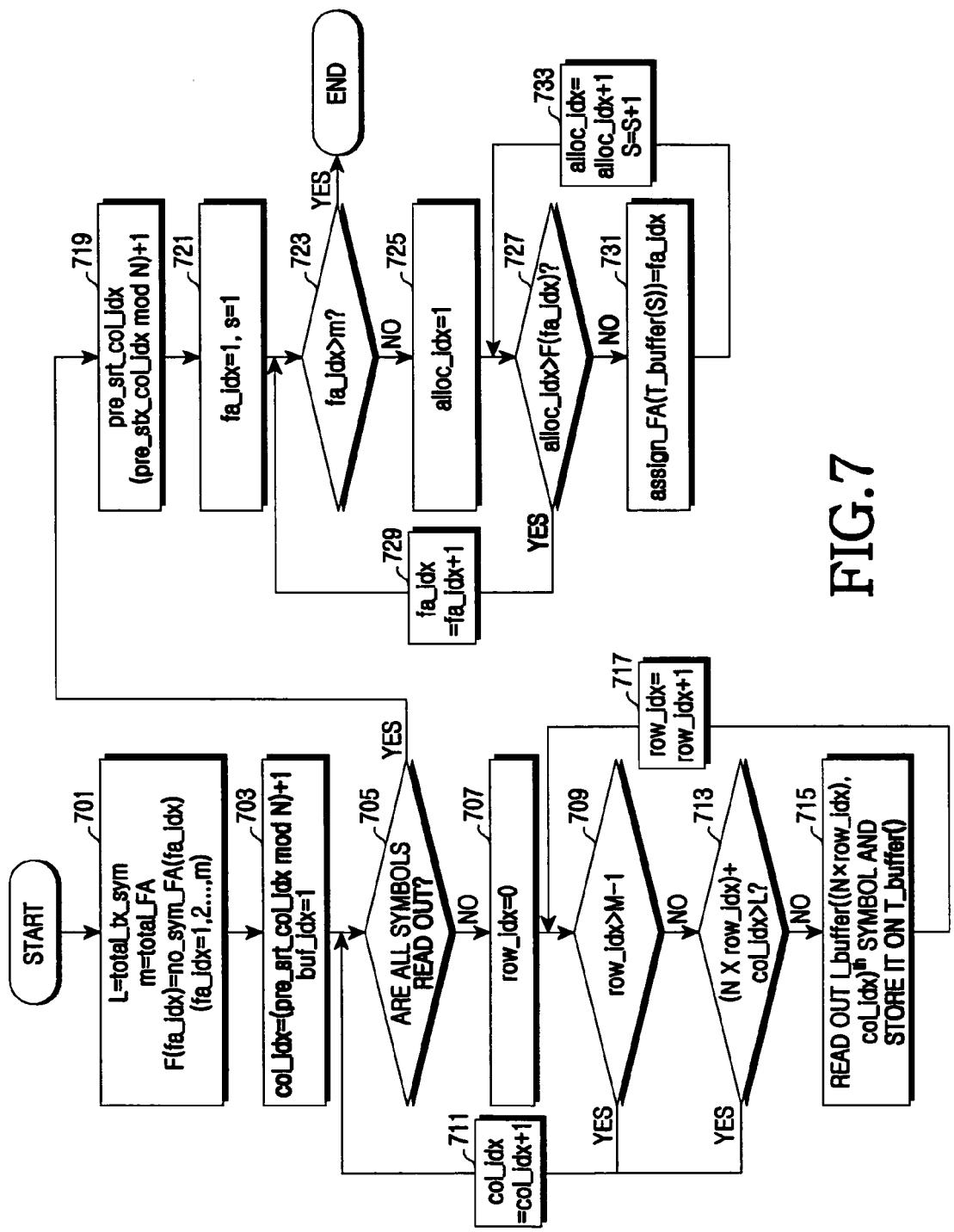
FIG. 7 illustrates a flowchart for an FA change process using an interleaving column switching scheme of a transmitting end in a broadband wireless communication system according to an exemplary embodiment of the present invention.

FIG. 7 illustrates a flowchart for an FA change process using an interleaving column switching scheme of a transmitting end in a broadband wireless communication system according to an exemplary embodiment of the present invention. The process of FIG. 7 is an exemplary operation of step 505 of FIG. 5 when the interleaving column switching scheme is used. It is assumed, in the following description, that M×N-sized block interleaving is used in the present invention.

Referring to FIG. 7, in step 701, the transmitting end initializes L to total_tx_sym that indicates a total number of symbols of an encoded packet, initializes m to total_FA that indicates a total number of FAs used to transmit the encoded packet, and initializes F(fa_idx) to No_sym_FA(fa_idx) that indicates the number of symbols allocated to an (fa_idx)$^{th}$ FA. The fa_idx is an integer greater than or equal to '1' and less than or equal to the m.

In step 703, the transmitting end sets col_idx to pre_srt_col_idx, i.e., a sum of '1' and a value obtained as a result of performing a modulo operation on N and an index of column at which the symbols start to be read out at previous transmission, where N denotes the number of columns of block interleaving. For example, in a case where four columns 1, 2, 3, and 4 exist, if the index of the column at which the symbols start to be read out at previous transmission is '1', the col_idx is set to '2' in step 703. Further, the transmitting end sets buf_idx to 1.

In step 705, the transmitting end determines whether the symbols are completely read out, that is, whether all symbols of the encoded packet are read out. If all symbols of the encoded packet are read out, the procedure proceeds to step 719.

Otherwise, if all symbols of the encoded packet are not read out, proceeding to step 707, the transmitting end sets row_idx to 0.

After setting the rox_idx to 0, proceeding to step 709, the transmitting end determines whether the row_idx is greater than M−1, where M denotes the number of rows of block interleaving. In other words, the transmitting end determines whether the row_idx is greater than an index of a last row of block interleaving. If the row_idx is greater than M−1, proceeding to step 711, the transmitting end increments the col_idx by '1', and the procedure returns to step 705.

Otherwise, if the row_idx is less than or equal to M−1, proceeding to step 713, the transmitting end determines whether a sum of the col_idx and a value obtained as a result of performing multiplication on N and the row_idx is greater than the L. That is, the transmitting end determines whether all symbols of the encoded packet are read out. If the sum of the col_idx and the value obtained as a result of performing multiplication on N and the row_idx is greater than the L, proceeding to step 711, the transmitting end increments the col_idx by 1, and the procedure returns to step 705.

Otherwise, if the sum of the col_idx and the value obtained as a result of performing multiplication on N and the row_idx is less than or equal to the L, proceeding to step 715, the transmitting end reads out an I_buffer((N×row_idx),col_idx)$^{th}$ symbol, i.e., a symbol stored at an (N×row_idx)$^{th}$ row and a (col_idx)$^{th}$ column of a block interleaving buffer. Then the transmitting end stores the read-out symbols sequentially in a separate transmission buffer T_buffer( ).

Thereafter, the transmitting end increments the row_idx by '1', and the procedure returns to step 709.

If all symbols of the encoded packet are read out in step 705, proceeding to step 719, the transmitting end sets pre_s-rt_col_idx to a sum of '1' and a value obtained as a result of performing a modulo operation on the pre_srt_col_idx and N. That is, to calculate an FA to be retransmitted at next retransmission, the transmitting end updates the pre_srt_col_idx.

In step 721, the transmitting end initializes fa_idx to '1', and initializes s to '1'.

After initializing these variables (i.e., fa_idx and s), proceeding to step 723, the transmitting end determines whether the fa_idx is greater than the m. If the fa_idx is greater than the m, the procedure of FIG. 7 ends.

Otherwise, if the fa_idx is less than or equal to the m, proceeding to step 725, the transmitting end sets alloc_idx to '1'.

After setting the alloc_idx to '1', proceeding to step 727, the transmitting end determines whether the alloc_idx is greater than F(fa_dx), i.e., the number of slots allocated to an (fa_idx)$^{th}$ FA. If the alloc_idx is greater than the F(fa_idx), proceeding to step 729, the transmitting end increments the alloc_idx by '1', and the procedure returns to step 723.

Otherwise, if the alloc_idx is less than or equal to the F(fa_idx), proceeding to step 731, the transmitting end sets assign_FA(T_buffer(s)), i.e., a retransmission FA of a symbol positioned at an s$^{th}$ address of T_buffer ( ), to the fa_idx.

In step 733, the transmitting end increments the alloc_idx by '1', and increments the s by '1'°. Then, the procedure returns to step 727.

Thereafter, steps 723 to 733 are repeated until the fa_idx is greater than m, so as to determine a retransmission FA of each symbol.

Figure 8:
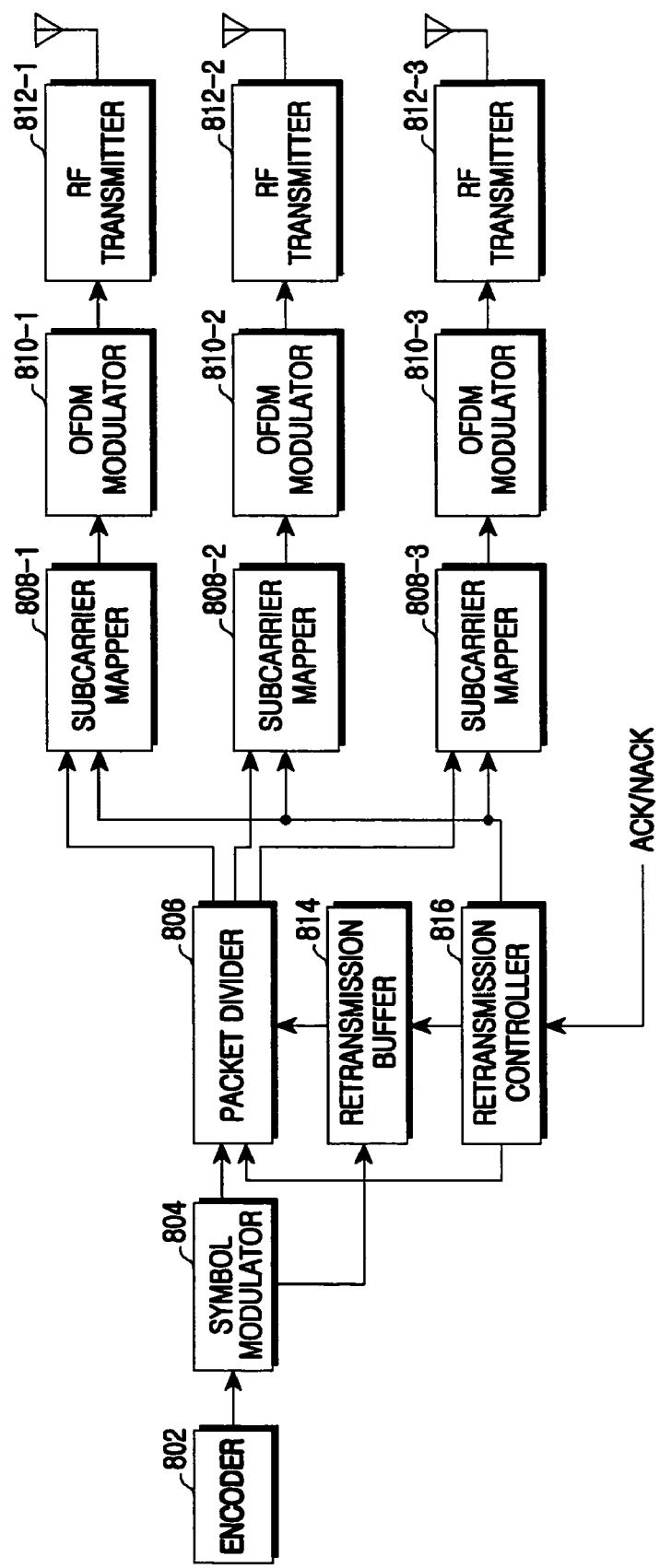
FIG. 8 illustrates a block diagram of a transmitting end of a broadband wireless communication system according to an exemplary embodiment of the present invention.

FIG. 8 illustrates a block diagram of a transmitting end of a broadband wireless communication system according to an exemplary embodiment of the present invention. The transmitting end having a structure of FIG. 8 can use three (3) FAs according to a frequency overlay scheme. When the transmitting end can use two (2), four (4) or more FAs, a similar structure as that of FIG. 8 is used.

Referring to FIG. 8, the transmitting end includes an encoder 802, a symbol modulator 804, a packet divider 806, a plurality of subcarrier mappers 808-1 to 808-3, a plurality of OFDM modulators 810-1 to 810-3, a plurality of Radio Frequency (RF) transmitters 812-1 to 812-3, a retransmission buffer 814, and a retransmission controller 816.

The encoder 802 performs channel coding on an input data bit-stream to generate an encoded packet. The symbol modulator 804 modulates the encoded packet to convert the packet into complex symbols.

To transmit a single encoded packet through a plurality of FAs, the packet divider 806 divides the single encoded packet into a plurality of parts to be transmitted using each FA. Further, the packet divider 806 provides each part to the subcarrier mappers 808-1 to 808-3 for managing each FA.

Each of the subcarrier mappers 808-1 to 808-3 maps the complex symbols to be transmitted using its corresponding FA to a frequency domain. Each of the OFDM modulators 810-1 to 810-3 converts the complex symbols mapped to the frequency domain into time-domain signals by performing an Inverse Fast Fourier Transform (IFFT) operation, and configures an OFDM symbol to be transmitted using its corresponding FA by inserting a Cyclic Prefix (CP). Each of the RF transmitters 812-1 to 812-3 up-converts a baseband signal into its corresponding RF signal, and transmits the RF signal through an antenna.

The retransmission buffer 814 stores the encoded packet that needs to be retransmitted. If an ACK is received for the stored encoded packet, the retransmission buffer 814 deletes the encoded packet corresponding to the ACK. If a NACK is received for the stored encoded packet, the retransmission buffer 814 provides the encoded packet corresponding to the NACK to the packet divider 806 under the control of the retransmission controller 816.

According to the ACK or NACK fed back from a receiving end, the retransmission controller 816 determines whether the packet needs to be retransmitted. If the NACK is received, the retransmission controller 816 provides control such that the encoded packet stored in the retransmission buffer 814 is retransmitted. In particular, if the encoded packet is retransmitted, the retransmission controller 816 determines an FA to be used at retransmission so that a different FA is mapped at initial transmission and retransmission to at least one of the subunit entities constituting the parts of the encoded packet. Further, the retransmission controller 816 provides determined retransmission FA information to the packet divider 806. The subunit entity is a part or a symbol.

The determination of the FAs for retransmission may be performed using various schemes. For example, the address mapping scheme of FIG. 3 or the interleaving column switching scheme of FIG. 4 can be used. When the address mapping scheme is used, the retransmission controller 816 determines a retransmission FA by performing the process of FIG. 6. That is, the retransmission controller 816 performs cyclic shifting on a mapping relation between the parts and the FAs. For this, the retransmission controller 816 recalculates FAs to be mapped with slot-sized parts included in each part. More specifically, the retransmission controller 816 evaluates an index of an FA mapped with one part at previous transmission, and calculates an index of an FA to be mapped with the part at retransmission by calculating a sum of '1' and a value obtained as a result of performing a modulo operation on the index of the FA with a total number of FAs.

When the interleaving column switching scheme is used, the retransmission controller 816 determines a retransmission FA by performing the process of FIG. 7. Further, the retransmission controller 816 controls packet division of the packet divider 806 and an output of divided parts according to the determined retransmission FA. When the interleaving column switching scheme is used, the transmitting end further includes an interleaver (not shown) for performing block interleaving in a symbol unit. Accordingly, the retransmission controller 816 controls the interleaver (not shown) to read out symbols from a block interleaving buffer in an order different from that used at previous transmission, and determines FAs to be mapped with the symbols in an order of reading out the symbols.

According to exemplary embodiments of the present invention, in a broadband wireless communication system supporting a frequency overlay scheme, a transmitting end transmits packets through different FAs at initial transmission and retransmission, and thus, a receiving end can obtain an additional frequency gain when Chase Combining (CC) is performed.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmission of a packet using a plurality of Frequency Allocations (FAs) in a wireless Orthogonal Frequency Division Multiplexing (OFDM) communication system, the method comprising:
   interleaving a packet to re-arrange each of a plurality of parts of the packet according to a first read-out order;
   mapping the plurality of parts of the packet to at least one of the plurality of FAs based on a result of the interleaving;
   when a re-transmission request is received, interleaving the packet to re-arrange each of the plurality of parts of the packet according to a second read-out order that is different from the first read-out order;
   re-mapping the plurality of parts of the packet to at least one of the plurality of FAs based on a result of the interleaving for re-transmission such that at least one of the plurality of parts of the packet is re-mapped to an FA that is different than an FA previously mapped thereto; and
   transmitting the re-mapped plurality of parts of the packet through the plurality of FAs at least one corresponding FA by using at least one of a plurality of radio frequency (RF) transmitters, each FA corresponding to a different RF transmitter such that parts of the packet that are transmitted through different FAs pass through different RF transmitters.

2. The method of claim 1, wherein each of the plurality of parts of the packet constitute a symbol.

3. The method of claim 2, wherein the re-mapping comprises:
   reading out the symbols in the second read-out order; and
   mapping the symbols to the corresponding FAs in the order of the read out of the symbols.

4. The method of claim 1, wherein the interleaver is further configured to interleave the packet by:
   writing the plurality of parts of the packet in a horizontal-axis direction in an interleaving buffer configured with matrix form; and
   reading out the plurality of parts of the packet in a vertical-axis direction from the interleaving buffer.

5. The method of claim 4, wherein the second read out order differs from the first read-out order in an order of column read out.

6. An apparatus for transmitting packet using a plurality of Frequency Allocations (FAs) in a wireless Orthogonal Frequency Division Multiplexing (OFDM) communication system, the apparatus comprising:
   an interleaver configured to interleave a packet to re-arrange each of a plurality of parts of the packet according to a first read-out order;
   at least one mapper configured to map the plurality of parts of the packet to at least one of the plurality of FAs based on a result of the interleaving; and
   a plurality of transmitters, each of the plurality of transmitters configured to transmit the plurality of parts of the packet through a corresponding FA, each of the one or more FAs corresponding to a different RF transmitter such that parts of the packet that are transmitted through different FAs pass through different RF transmitters:
   wherein the interleaver is further configured to, when a re-transmission request is received, interleave the packet to re-arrange each of the plurality of parts of the packet according to a second read-out order that is different from the first read-out order, wherein the at least one mapper is further configured to re-map the plurality of parts of the packet to at least one of the plurality of FAs based on a result of the interleaving for re-transmission such that at least one of the plurality of parts of the packet is re-mapped to an FA that is different than an FA previously mapped thereto, and transmitted using a corresponding transmitter.

7. The apparatus of claim 6, wherein each of the plurality of parts of the packet constitute a symbol.

8. The apparatus of claim 7, wherein the at least one mapper is further configured to read out the symbols in the second read-out order, and map the symbols to the at least one of the plurality of FAs in the order of the read out of the symbols.

9. The apparatus of claim 6, wherein the interleaver is further configured to write the plurality of parts of the packet in a horizontal-axis direction in an interleaving buffer configured with matrix form, and read out the plurality of parts of the packet in a vertical-axis direction from the interleaving buffer.

10. The apparatus of claim 9, wherein the second read out order differs from the first read-out order in an order of column read out.

* * * * *